United States Patent

Larsson

[11] Patent Number: 5,649,723
[45] Date of Patent: Jul. 22, 1997

[54] COUPLING DEVICE

[75] Inventor: Kurt Larsson, Lidingö, Sweden

[73] Assignee: AGA Aktiebolag, Lidingo, Sweden

[21] Appl. No.: 436,317

[22] PCT Filed: Sep. 16, 1994

[86] PCT No.: PCT/SE94/00863

§ 371 Date: May 18, 1995

§ 102(e) Date: May 18, 1995

[87] PCT Pub. No.: WO95/08734

PCT Pub. Date: Mar. 30, 1995

[30] Foreign Application Priority Data

Sep. 20, 1993 [SE] Sweden ................ 9303057

[51] Int. Cl.⁶ ................................. F16L 37/12
[52] U.S. Cl. ................ 285/34; 285/35; 285/402; 285/322
[58] Field of Search ................ 285/33, 34, 35, 285/322, 323, 81, 376, 402; 411/433, 267, 270

[56] References Cited

U.S. PATENT DOCUMENTS

| 686,389 | 11/1901 | Cox | 285/34 |
|---|---|---|---|
| 961,283 | 6/1910 | Barker | 285/34 |
| 1,006,190 | 10/1911 | Estell | 285/34 |
| 1,211,387 | 1/1917 | Beck | 411/432 |
| 2,259,137 | 10/1941 | Iftiger, Sr. | |
| 2,327,714 | 8/1943 | Iftiger, Sr. | |
| 2,463,179 | 3/1949 | Iftiger, Sr. | 285/34 |
| 2,467,036 | 4/1949 | Iftiger, Sr. | 285/33 |
| 3,168,333 | 2/1965 | Dziura | 285/35 |
| 3,394,950 | 7/1968 | Jensen | 285/35 |
| 3,870,332 | 3/1975 | Eaton | 285/35 |
| 4,191,406 | 3/1980 | Eaton | 285/35 |
| 4,540,201 | 9/1985 | Richardson | 285/372 |

FOREIGN PATENT DOCUMENTS

| 36 39 528 | 11/1987 | Germany. | |
| 10788 | of 1912 | United Kingdom | 285/55 |

*Primary Examiner*—Eric K. Nicholson
*Attorney, Agent, or Firm*—Pollock, Vande Sande & Priddy

[57] ABSTRACT

A coupling device for releasable and sealing connection to a tubular, externally threaded connector part. The device includes internally threaded segments which can swing radially to enable the coupling device to be connected to and released from the connector part. An axially movable sleeve is mounted concentrically around the segments and can be moved over the segments between a forward position in which the sleeve brings the threaded segments into meshing engagement with the threads of the connector part, and a rear position in which the segments are able to swing out so as to release the engagement. The segments and the sleeve also include mutually coacting means which, when in engagement with one another, limit the possibility of relative rotational movement in one direction between the segments and the sleeve.

11 Claims, 3 Drawing Sheets

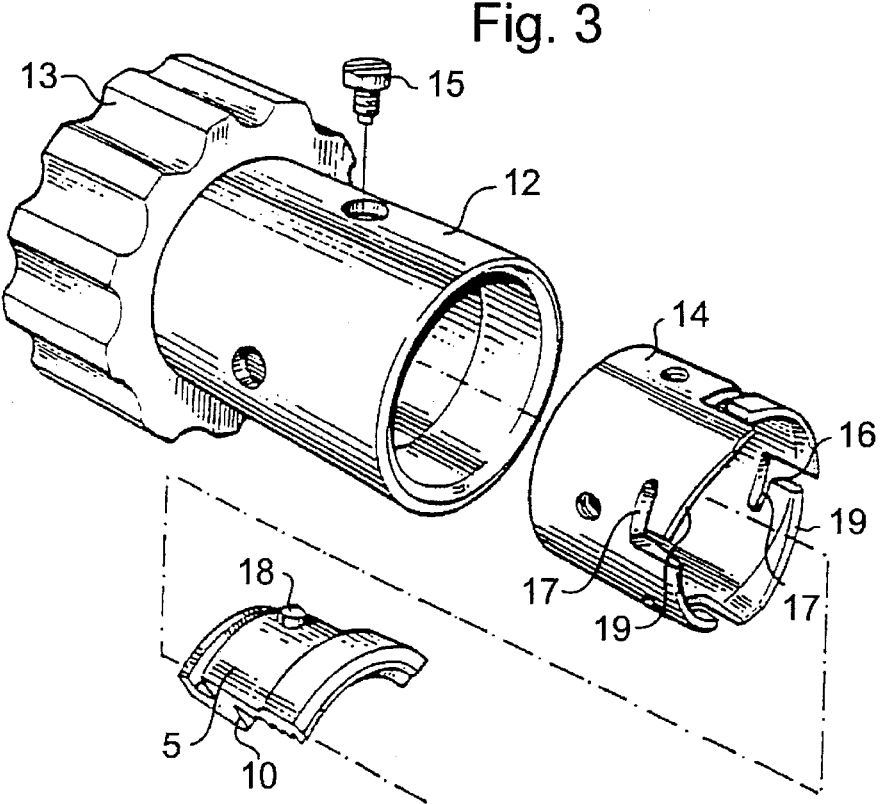
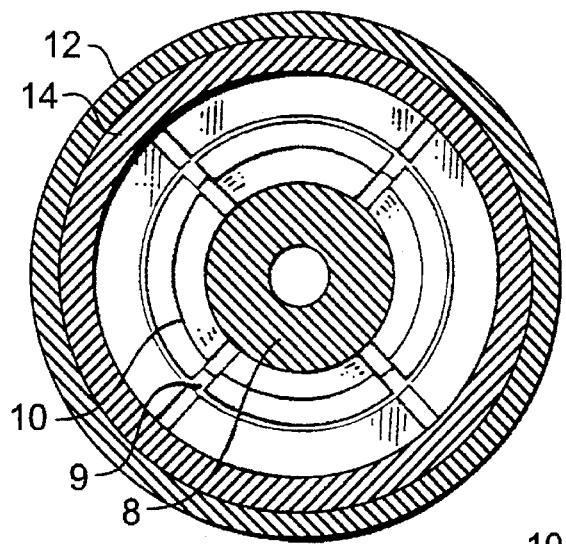
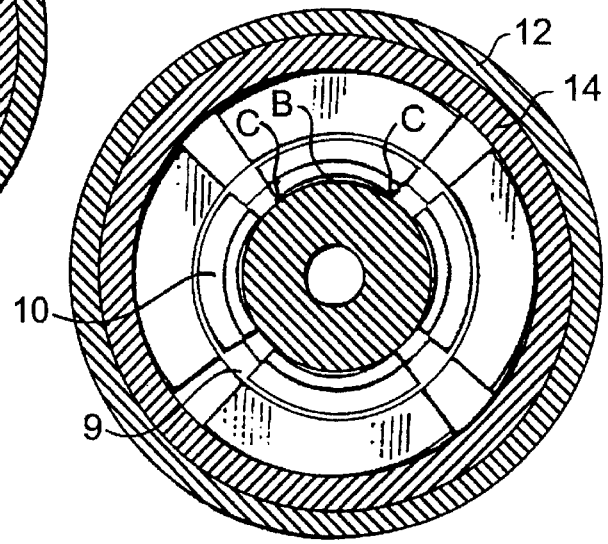

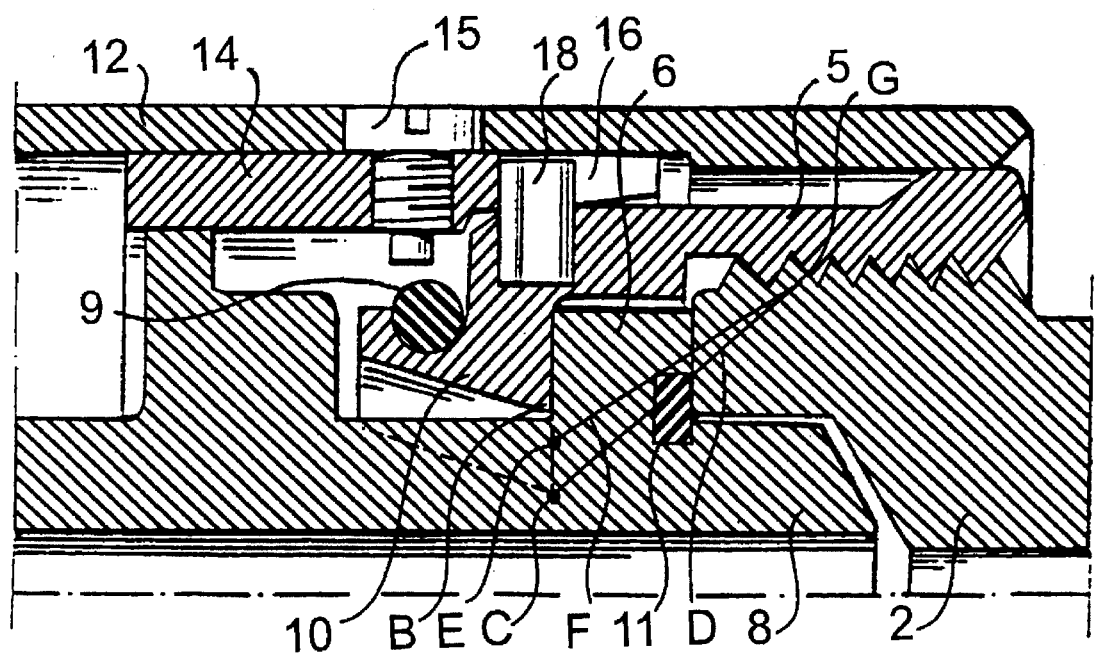

COUPLING DEVICE

TITLE OF THE INVENTION

1. Field of the Invention

The present invention relates to a coupling device which will enable a fluid line to be connected quickly and easily to and disconnected from an externally screw-threaded connector part, so as to enable fluid to be conveyed without risk of leakage, even when the fluid is under high pressure.

2. Background of the Invention

There is in many instances a need to simplify coupling procedures, particularly when needing to make and release connections frequently with short intermediate periods, particularly with regard to the number of turns through which a screw-threaded coupling device must be rotated in order to make or to release a connection. It would be very beneficial if the distance through which the device has to be rotated could be shortened, for when automating the connection and disconnection of such coupling devices, for instance with the aid of robotics. In this regard, particularly high demands are placed on coupling devices of this nature when they are intended for use with high-pressure media, for instance in hydraulic systems and systems which utilize highly pressurized gases.

U.S. Pat. No. 3,870,332 teaches a coupling device for a releasable and sealing connection to a tubular, externally threaded connector part. This device includes a) a centerpiece which is connected to one end of a fluid conveying line and which includes a fluid passage in the extension of the line, and a radially and outwardly directed flange;

b) at least two gripping elements which are intended to grip around the flange and which have the form of arcuate, internally threaded segments for engagement with the connector part. These segments are radially pivotal to enable the coupling device to be connected to and released from the connector part;

c) an axially displaceable sleeve which is arranged concentrically around the centerpiece and which can be moved over the segments, between a forward position in which the sleeve brings the threaded segments into meshing engagement with the threads of the connector part, and a rearward position in which the segments are able to swing or pivot out of engagement with said threads; and d) mutually coacting means on the segments and the sleeve which when in mutual engagement restrict the possibility of relative rotational movement between the segments and the sleeve.

In the case of this known device, when the threaded segments are in meshing engagement with the screw-threads of the connector part, any unintentional retraction of the sleeve caused by small rotation of the sleeve in the release direction will cause the segments to swing-out and fully release the coupling. This constitutes a serious accident risk, particularly when working at very high pressures.

Similar coupling devices are also described in U.S. Pat. No. 2,327,714 and U.S. Pat. No. 4,191,406. The coupling devices taught by these patent specifications also have the aforesaid drawbacks.

SUMMARY OF THE INVENTION

The main object of the present invention is to provide a coupling device of the general kind defined in the aforesaid U.S. Pat. No. 3,870,332, but with which the risks of unintentional release of the coupling are essentially fully eliminated.

The inventive coupling is characterized in that those points around which a segment rotates when swinging outwards are so located that if the segment attempts to swing outwards after a connection has been made, the arc movement of at least points situated adjacent the top of the screw-thread of the segment will cut through or intersect an adjacent thread flank of the external screw-thread of the connector part. Outward swinging of the segment is thereby prevented without previously relieving the coupling of load by rotating the segment in relation to the connector part.

Thus, in accordance with this embodiment, the segments are unable to swing outwards until the screw-thread coupling has been loosened or backed-off slightly, by rotating the coupling parts in relation to one another. Hence, the thread pitch will provide a clearance that will allow the thread flanks of the segments and connector part to pass freely relative to one another.

According to one preferred embodiment, the segment rotational points are located so that the segments must be rotated through 30°–45° in order for the free passage or clearance to be obtained.

The aforesaid mutually coacting means on the segments and the sleeve include pins which project out radially from the segments, and slots which extend axially in the front end of the sleeve and which coact with the pins as the sleeve is moved over the segments. In this regard, the slots are conveniently carded by an inner sleeve which is fitted into the first-mentioned sleeve, i.e. the outer sleeve, and which can be fixed to the outer sleeve by means of screws. These screws are also intended to coact with an abutment surface on the centerpiece to prevent the sleeve from being moved over the centerpiece in conjunction with rearward movement. The provision of such an inner sleeve enables the coupling device to have a completely smooth outer surface with no visible slots.

According to another embodiment of the invention, the mutually coacting means on the segments and on the sleeve have the form of slots which extend axially in the segments, and the form of pins which project radially inwards and which coact with the slots as the sleeve is moved over the segments. These pins prevent the front part of the sleeve from being drawn over the centerpiece of the coupling device.

Each of the axially extending slots merges at its inner end with a short slot which extends circumferentially and which permits given relative rotation between the sleeve and the segments prior to the establishment of dogging engagement therebetween. This arrangement provides further security against unintentional release of the coupling, since the sleeve must first be rotated in a coupling release direction before it can be moved axially.

It is also preferred that the slotted part of the coupling device includes a guide surface which connects with the axially extending slot and which coacts with an associated pin for movement of the sleeve in an opening direction upon commencing to rotate the sleeve before the pin has been inserted into the slot to the extent intended. This arrangement will prevent the coupling device from being screwed onto a connector part whose thread dimensions am greater than those for which the device is intended.

In order to enable the threaded sections to be swung-out simply and automatically when the threads of the sections no longer mesh with the threads of the connector part, an elastic annular element can be fitted around the rear end-parts of the sections. The elastic annular holds the sections around and in engagement with the centerpiece flange and causes the front ends of the sections to adopt an outwardly swung position when the sleeve is retracted subsequent to a given extent of relative rotation between the segments and the connector part.

The rear part of the centerpiece is preferably in the form of a cylindrical body which forms a surface on which the sleeve is guided as it moves.

BRIEF DESCRIPTION OF THE DRAWINGS

The invention will now be described in more detail with reference to an exemplifying embodiment thereof and also with reference to the accompanying drawings.

FIG. 3 illustrates the components of the coupling device shown in FIG. 2.

FIG. 4 is a partial sectional view corresponding to FIG. 2 and shows the parts in screw-thread engagement with one another.

FIG. 5 and 6 are cross-sectional views taken on the line 5—5 in FIG. 2 with the coupling device in an engagement position according to FIG. 4 and in an open position according to FIG. 2.

DETAILED DESCRIPTION OF THE PREFERRED EMBODIMENTS

Figure 1:
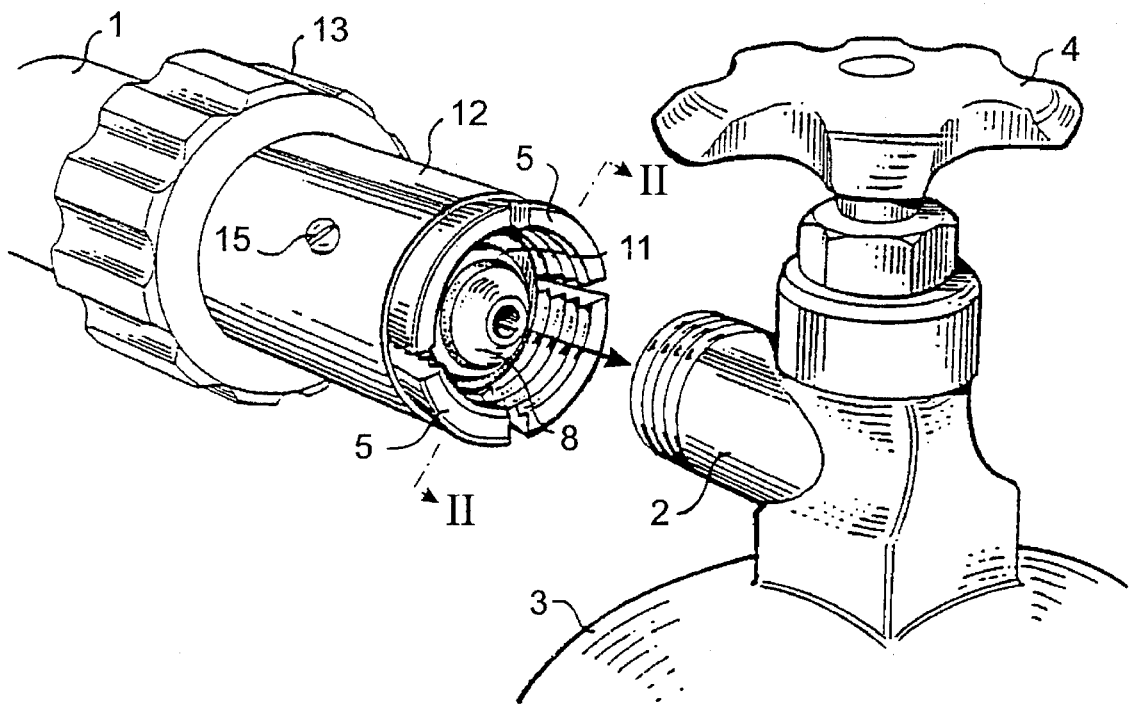
FIG. 1 is a perspective view of an inventive coupling device.

The coupling device illustrated in FIG. 1 is intended to connect a fluid line 1 to a connector part 2 which has an external screw-thread and which is mounted on a container 3 containing gas under high pressure. A valve arrangement provided with a wheel or knob 4 is mounted between the connector part 2 and the container 3. In the illustrated embodiment, the coupling device includes four arcuate gripping elements in the form of cylindrical segments 5 which have an internal screw-thread corresponding to the external thread of the connector part 2.

Figure 2:
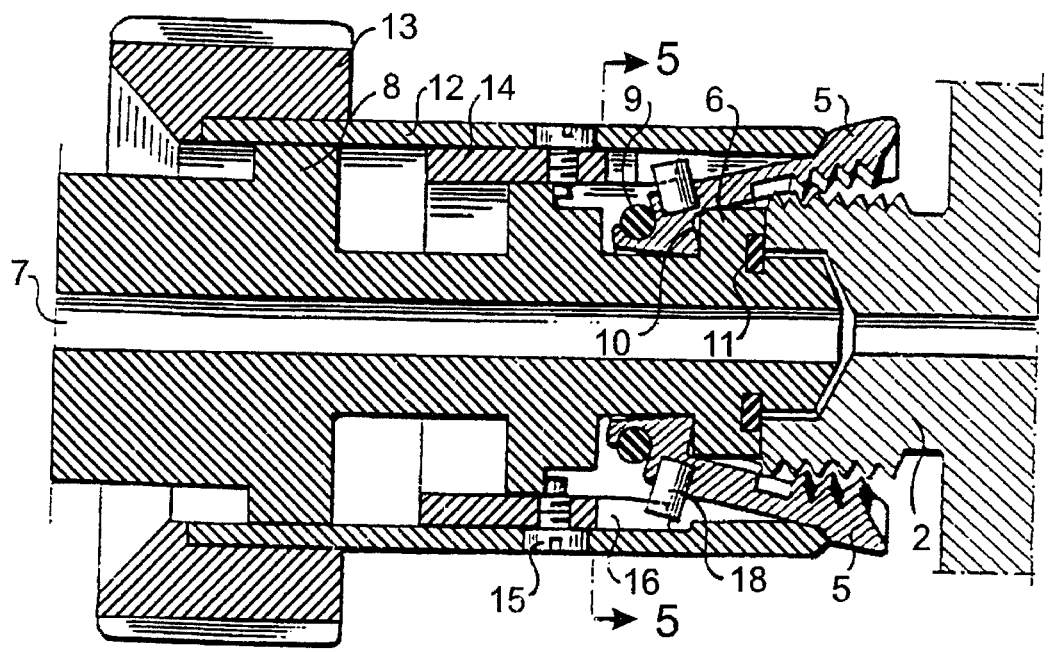
FIG. 2 is a longitudinal sectional view of the coupling device shown in FIG. 1 and illustrates the device in a combined but open state.

As will be seen from the sectioned view in FIG. 2, the segments 5 are disposed around a radially and outwardly directed flange 6 on a centerpiece 8 which includes a throughpassing fluid channel 7. The channel 7 connects the fluid line 1 to the connector part 2, such that the fluid line 1 passes into or is fixed in the centerpiece, for instance, screwed therein. Before the connection is made, the segments 5 are held in an outwardly swung, diverging position with the aid of an elastic O-ring 9 which is fitted around the rear end-parts of the elements and which exerts a radially and inwardly acting force on the end parts. The front ends of the sections are swung outwards by virtue of the coaction between points on the forward, inner edge of a shoulder part 10 of a respective segment 5 and an adjacent part of the flange 6, as will be described in more detail below. The shoulder part 10 and the flange 6 also coact to press the centerpiece 8 against the connector part 2 with a force necessary to achieve the desired sealing pressure therebetween. To this end, an O-ring seal 11 is fitted in a slot in the front surface of the centerpiece.

Fitted around the centerpiece 8 and the segments 5 is a sleeve 12 which includes a handgrip 13 to facilitate rotation of the sleeve. The sleeve 12 is both rotatable and axially movable in relation to the centerpiece and said segments, wherein a rear, cylindrical part of the centerpiece 8 forms a sleeve guide surface.

In the case of the illustrated embodiment, see also FIG. 3, an inner sleeve 14 is fitted in the sleeve 12, i.e. the outer sleeve, with the aid of screws 15. The inner sleeve 14 is provided with slots 16 which extend axially from the forward end of the sleeve and each of the inner ends of which merges with a respective short, at least generally peripheral slot 17. Each segment 5 includes a guiding and dogging pin or stud 18 which engages in a respective slot in the inner sleeve 14. FIGS. 1 and 2 illustrate the sleeve 12 in a retracted or withdrawn position, which is determined by coaction of the screws 15 with an abutment surface on the centerpiece 8, in which position the studs 18 engage with the front part of respective slots 16 in the sleeve 14. When the sleeve 12 is moved forwards, the front end of the sleeve will exert on the segments 5 a force which causes the segments to swing radially inwards against the force exerted by the O-ring 9 on the rear parts of the segments and take mutually parallel positions.

The short slots 17 extending around the circumferential surface of the inner sleeve 14 enable the sleeve 12 to be rotated slightly in relation to the segments 5 when the sleeve is in its forward position, so that the studs 18 are able to move into a locking position in the slots 17. However, if the studs 18 are not inserted sufficiently far into the axially extending slots 16, this rotation of the sleeve 12 will cause the studs to slide on a guide surface 19 and therewith cause the sleeve 12 to move backwards, i.e. to retract.

Thus, when using the coupling device the segments 5 are moved so as to lie above the screw-thread of the connector part 2 in the position illustrated in FIG. 2, with the segments 5 in an outwardly swung position, as shown in FIG. 1. The sleeve 12 is then moved forwards so as to cause the segments 5 to swing in and achieve the correct thread engagement between the inner threads of the segments and the outer threads of the connector part 2, as shown FIG. 4. The studs 18 are then located at the inner ends of the axially extending slots 16. The sleeve 12 is rotated in this position with the aid of the grip 13, such that the studs first move in the peripheral slots 17 and the segments 5 are then dogged in the direction of rotation of the sleeve, so as to produce the requisite sealing pressure between the sleeve and the centerpiece 8 by virtue of the screw-thread coaction with the connector part. Normally, the distance through which the sleeve is rotated will be less than one revolution.

Thus, the illustrated coupling device will provide the requisite sealing pressure by virtue of an axial movement of the sleeve 12 through a short distance, followed by a relatively small rotational movement of the sleeve. If the dimensions of the connector part 2 are somewhat greater than those dimensions for which the coupling device is intended, it will not be possible to move the sleeve 12 to its outer end position. Thus, if an attempt is nevertheless made to rotate the sleeve, the sleeve will be pushed back as a result of the coaction of the studs 18 with the guide surfaces 19, whereupon the segments are reopened by virtue of the force exerted by the O-ring 9. It is important from the aspect of safety to avoid leakage as a result of improperly made connections. Furthermore, it is possible by appropriate choice of the dimensions of coupling devices and connector parts to avoid connecting a fluid line to the wrong fluid source. An error of this nature would have very significant consequences in hospitals and laboratories, for instance.

The short, peripheral slots 17 which receive the studs 18 in the active working state of the device prevent unintentional disconnection of the device from the connector part as a result of a single axially applied force, generated for instance by a knock, blow or some other source. Thus, in order to release or disconnect the coupling device it is necessary to first rotate the sleeve 12 slightly so that the studs 18 will be located opposite the relevant slots 16. Because no appreciable force is required to rotate the sleeve, due to the clearance between the sleeve 12 and the segments 5, it cannot be certain that the sleeve will not be rotated unintentionally under some unfortunate circumstances. Should such unintentional rotation of the sleeve be followed by the application of an axially acting force on the sleeve 12, it is possible that the coupling device will unintentionally open, should the segments thereafter be free to swing outwards.

In order to eliminate this risk, the inventive coupling device is constructed so that it is impossible for the segments 5 to swing outwards until the thread engagement between segments and connector part has been relieved of load to a certain extent by mutually rotating the segments and the connector part. Since after a screw-thread connection has been made, rotation of the segments requires a much larger force than that required to achieve the first relative rotation between sleeve and segments, it is practically impossible for the segments to be rotated unintentionally. Furthermore, unscrewing of a coupling device which is under pressure requires a greater force than with a pressureless coupling device, among other things, because of the greater friction between the segments and the outer sleeve. The inventive coupling device thus provides essentially complete safety against unintentional release of the coupling device.

According to the present invention, the aforedescribed function is achieved because the rotational points of the segments 5 are so situated that when an attempt is made to swing-out the segments of a fitted screw-threaded coupling device, the arc of movement of at least points located adjacent the top of the threads of the segment will cut through or intersect adjacent thread flanks of the external screw-thread of the connector part, as a result of these flanks abutting one another when the screw-threads are in mesh. Thus, in order for it to be possible for the segments to swing outwards, it is necessary to back off the screw joint slightly, so as to obtain a certain clearance between the aforesaid flanks due to the pitch of the threads. This clearance enables the thread flanks to pass free from one another as the segments swing outwards.

FIG. 4 is an axial sectional view of a connected coupling device, and shows the position of the pivot points of the segments 5. It is possible that this Figure would lead one to believe that the segments pivot or swing about the lowermost point B of the shoulder part 10 of the segment 5. However this point bactually lies at the top of the cylindrical centerpiece 8, and the actual pivot points of the cylindrical segments 5 will lie on the points C. These points are represented by the lower outer corners of the segments, lying closer to the center axis of the coupling device, on both sides of the highest located point B. This is also evident from the cross-sectional views shown in FIGS. 5 and 6, of which FIG. 5 shows the segments 5 parallel with one another and in screw mesh with the connector part 2, while the inner arcuate edges of the segments conform essentially to the curvature of the centerpiece 8. It will be seen from FIG. 6, in which the segments 5 are swung outwards, that rotation of the segments takes place about the points C which are the only points that have contact with the centerpiece 8 when the segments are in their outwardly swung positions.

The arrow D shown in FIG. 4 thus represents the radius of the circular arc around which a point G close to the top of one thread of the segment 5 will move as the segment swings outwards. In the case of an inventive coupling device, when the threads are in mesh, this arcuate movement will cut through adjacent flanks of the outer screw-thread of the connector part. This is evident by virtue of the pivot point C of the radius D lying closer to the longitudinal axis of the coupling device than the corresponding point E of the normal F to the flank surface at the same point G. It is thus not possible for the segment 5 to swing outwards, even should the sleeve 12 had been retracted. As mentioned before, in order for the segment 5 to be able to swing outwards, it is first necessary for the screw joint to be at least partially relieved of load, i.e. backed off, to obtain sufficient pitch-determined clearance between the two thread flanks, so that these flanks are able to pass freely of one another as the segment swings outwards.

The coupling device is preferably constructed so that the segments 5 and the connector part 2 must be rotated through 30°–45° in relation to one another before the segments 5 are able to swing outwards with the sleeve 12 retracted, where this outward swinging of the segments being initiated by the O-ring 9.

In the described exemplifying embodiment, the studs 18 are mounted on the segments 5 and the slots 16, 17 are formed in an inner sleeve 14 fitted into the sleeve 12. It will be understood, however, that these slots may be formed directly in the outer sleeve 12. Furthermore, as will also be understood by the skilled person, the slots and studs may be switched, so that the studs will project radially inwards from the sleeve 12 and coact with slots formed in the segments 5, preferably of the same configuration as that shown in FIG. 3. In this regard, guide surfaces corresponding to the surfaces 19 may also be provided on the segments.

An inventive coupling device can be modified in several other respects within the scope of the claims. For instance, the number of segments may vary, suitably within the range of 3–8. The configuration of the segments may also be different to that shown. The coupling device may be constructed from any metallic material, although it is preferred that the segments and the centerpiece are made of brass and the sleeve of steel. It will also be understood that the O-ring may be replaced with some other elastic element, such as an annular helical spring, capable of exerting a radially acting force on the rear end-parts of the segments. This force can also be obtained through the medium of mutually coacting guide surfaces on sleeve and segments.

I claim:

1. A coupling device for a releasable and sealing connection to an externally threaded tubular connector, said coupling device including a centerpiece connected to one end of a fluid conveying line and providing a fluid passage in an extension of said fluid conveying line, a radially outwardly directed flange located on said centerpiece, at least two gripping elements for gripping said flange, each gripping element including an arcuate internally threaded segment for engaging said connector, said segment being radially pivotal for connecting and releasing said coupling device, an axially displaceable sleeve concentrically located around said centerpiece and moveable over said segment between a forward position in which a threaded engagement is provided between said segment and said connector, and a rearward position in which said segment disengages from said connector by swinging outward, and mutually coacting means located on said segment and on said sleeve for restricting in one direction rotational movement between said segment and said sleeve, said coupling device further comprising rotational points, located on said segment about which said segment rotates by swinging outward, such that when, after a mutually meshing engagement between said segment and connector, said segment attempts to swing outward, an arc movement of at least points proximately situated at the top of said screw-thread in said segment will intersect adjacent thread flanks of said external-screw thread in said connector, thereby preventing said segment from swinging outward without loosening mutually meshing threads by rotating said segment with respect to said connector.

2. The device according to claim 1, wherein said segment is rotated about 30°–45° in order for said arc movement not to intersect said adjacent thread flanks.

3. The device according to claim 1, wherein said mutually coacting means comprises a stud projecting radially outwards from said segment and a slot extending axially along said sleeve, said stud coacting with said slot as said sleeve is moved over said segment.

4. The device according to claim 3, wherein an inner end of said slot merges with another slot which extends circumferentially along said segment for providing a predetermined rotational movement between said sleeve and said segment prior to a dogging engagement therebetween.

5. The device according to claim 3, further comprising an inner sleeve located within said sleeve, wherein said slot is located on said inner sleeve.

6. The device according to claim 5, further comprising a screw for attaching said inner sleeve to said sleeve, wherein said screw coacts with an abutment surface on said centerpiece for preventing said sleeve from being moved backwards over said centerpiece.

7. The device according to claim 1, wherein said mutually coacting means comprises a slot extending axially on said segment and a stud projecting radially inwards from said sleeve, said stud coacting with said slot as said sleeve is moved over said segment.

8. The device according to claim 7, wherein an inner end of said slot merges with another slot which extends circumferentially along said segment for providing a predetermined rotational movement between said sleeve and said segment prior to a dogging engagement therebetween.

9. The device according to claim 1, further comprising a guide surface on said segment for moving said sleeve over said segment.

10. The device according to claim 1, further comprising an elastic annular element fitted around an end portion of said segment for holding said segment around said flange and for bringing another end portion of said segment into an outwardly swung position when said sleeve is retracted.

11. The device according to claim 1, wherein an end portion of said centerpiece is cylindrically shaped for forming a guide surface for said sleeve being moved axially along said centerpiece.

* * * * *